US012568450B2

(12) United States Patent
Chen et al.

(10) Patent No.: US 12,568,450 B2
(45) Date of Patent: Mar. 3, 2026

(54) LOW-POWER-CONSUMPTION CONTROL METHOD AND SHORT-RANGE WIRELESS COMMUNICATION CHIP

(71) Applicant: HUAWEI TECHNOLOGIES CO., LTD., Shenzhen (CN)

(72) Inventors: Tong Chen, Shanghai (CN); Zehong Zhang, Shenzhen (CN); Rui Cui, Shanghai (CN); Shaojie Xue, Shenzhen (CN); Jiang Dong, Shenzhen (CN); Bixiang Hu, Shenzhen (CN); Qi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 18/476,053

(22) Filed: Sep. 27, 2023

(65) Prior Publication Data

US 2024/0023036 A1 Jan. 18, 2024

Related U.S. Application Data

(63) Continuation of application No. PCT/CN2021/083581, filed on Mar. 29, 2021.

(51) Int. Cl.
*H04W 52/02* (2009.01)
*H04W 52/52* (2009.01)

(52) U.S. Cl.
CPC ....... *H04W 52/52* (2013.01); *H04W 52/0245* (2013.01); *H04W 52/0258* (2013.01)

(58) Field of Classification Search
CPC ............. H04W 52/52; H04W 52/0245; H04W 52/0258
See application file for complete search history.

(56) References Cited

U.S. PATENT DOCUMENTS

2020/0235761 A1 7/2020 Belghoul et al.

FOREIGN PATENT DOCUMENTS

WO 2018081472 A1 5/2018

*Primary Examiner* — Gbemileke J Onamuti
(74) *Attorney, Agent, or Firm* — WOMBLE BOND DICKINSON (US) LLP

(57) ABSTRACT

This application provides a low-power-consumption control method and a short-range wireless communication chip, and belongs to the field of short-range wireless communication technologies. The method includes: obtaining actual received signal strength indications corresponding to a plurality of historical receive slots; predicting, based on the actual received signal strength indications corresponding to the plurality of historical receive slots, received signal strength corresponding to a current receive slot; and adjusting a gain coefficient of a receive channel in a radio frequency front-end module in the current receive slot based on a predicted received signal strength indication. The radio frequency front-end module is coupled to the short-range wireless communication chip.

18 Claims, 3 Drawing Sheets

S201: Obtain actual received signal strength indications of a plurality of historical receive slots before a current receive slot S202: Predict based on predicted samples and a sensitivity value S203: Predict based on predicted samples and a first condition S204: Adjust a gain coefficient based on a predicted received signal strength indication

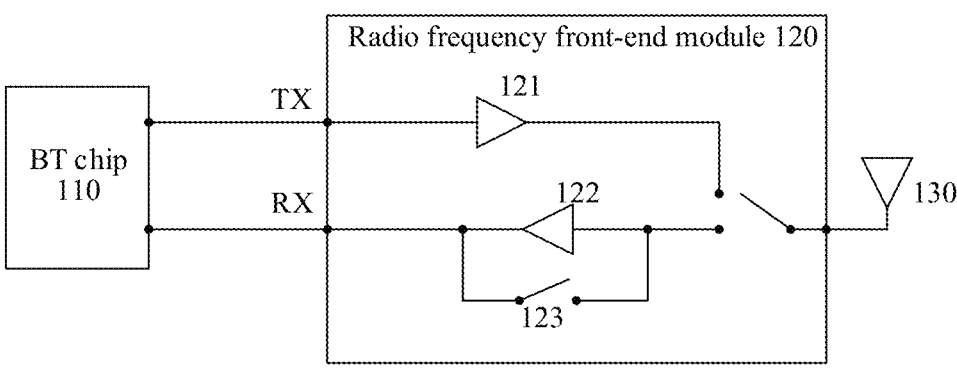

FIG. 1

S101: Obtain actual received signal strength indications of a plurality of historical receive slots before a current moment S102: Predict a predicted received signal strength indication corresponding to a next receive slot after the current moment S103: Adjust a gain coefficient of a receive channel based on the predicted received signal strength indication

FIG. 2

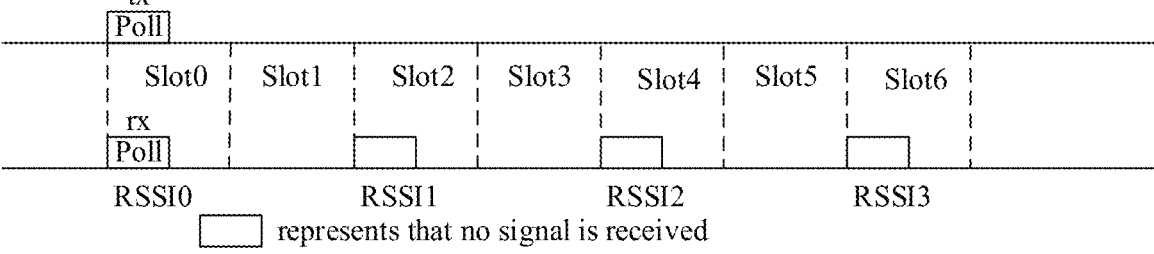

tx represents sent signal, and rx represents received signal

FIG. 3 tx
Poll

| Slot0 | Slot1 | Slot2 | Slot3 | Slot4 | Slot5 | Slot6 | rx
Poll

RSSI0      RSSI1      RSSI2      RSSI3

☐ represents that no signal is received

FIG. 4

LOW-POWER-CONSUMPTION CONTROL METHOD AND SHORT-RANGE WIRELESS COMMUNICATION CHIP

CROSS-REFERENCE TO RELATED APPLICATIONS

This application is a continuation of International Application No. PCT/CN2021/083581, filed on Mar. 29, 2021, the disclosure of which is hereby incorporated by reference in its entirety.

TECHNICAL FIELD

This application relates to the field of short-range wireless communication technologies, and in particular, to a low-power-consumption control method and a short-range wireless communication chip.

BACKGROUND

With the continuous development of wireless communication technologies, different types of devices to which the wireless communication technologies are applied appear in the market. A Bluetooth (BT) technology and a Bluetooth low energy (BLE) technology are used as examples. There are more and more devices with a Bluetooth function, such as a Bluetooth headset, a Bluetooth band, and a Bluetooth watch, to which the BT or BLE technology is applied.

Devices with the BT or BLE technology have various product forms. Due to the different product forms, each device is designed with its own unique antenna to receive an external radio signal. To improve user experience, a multi-antenna design is even used in some devices. To counteract link attenuation from a chip port to an antenna port in a device, most devices are generally designed with radio frequency front-end modules, to improve performance of the devices in receiving the radio signal.

In addition to the performance improvement, application of the radio frequency front-end module also increases power consumption of the device. In the conventional technologies, automatic gain control (AGC) is generally used in a method for controlling, by a receiving device, a receive channel of the radio frequency front-end module. The AGC refers to presetting a low noise amplifier (LNA) on a receive channel to an enabled state, and then comparing a received signal strength indication when a signal of a sending device arrives with an enabling threshold of the LNA, and controlling a status of the LNA during subsequent signal reception based on a comparison result. Therefore, an enabling period of the LNA before a signal of a peer device arrives is an invalid enabling period, which results in waste of power consumption. A longer invalid enabling period indicates a greater power consumption loss. Especially for the receiving device such as a headset that needs to be connected to the sending device for a long time, the AGC brings more unnecessary waste of power consumption to the headset.

SUMMARY

Embodiments of this application provide a low-power-consumption control method and a short-range wireless communication chip. Received signal strength corresponding to a current receive slot is predicted, and then a gain coefficient of a receive channel in a radio frequency front-end module is adjusted based on a predicted value, so that an objective of controlling an LNA working status is achieved, an invalid enabling time of the receive channel in the radio frequency front-end module is shortened, and power consumption of the radio frequency front-end module is reduced.

According to a first embodiment, this application provides a low-power-consumption control method, applied to a short-range wireless communication chip, and the method includes: obtaining actual received signal strength indications corresponding to a plurality of historical receive slots; determining, based on the actual received signal strength indications corresponding to the plurality of historical receive slots, a predicted received signal strength indication corresponding to a current receive slot; and controlling, based on the predicted received signal strength indication, a gain coefficient of a receive channel in a radio frequency front-end module coupled to the short-range wireless communication chip in the current receive slot.

In the foregoing technical solution, the short-range wireless communication chip predicts a strength indication of a signal to be received in the current receive slot, and then adjusts the gain coefficient of the receive channel in the radio frequency front-end module in the current receive slot based on the predicted value. Compared with the conventional technologies in which the gain coefficient of the receive channel is adjusted to a non-zero value in advance and the gain coefficient is re-adjusted after the signal is received, in the solution in this application, a time in which the receive channel is in non-zero gain is shortened, so that power consumption of the radio frequency front-end module is reduced, and a usage time of a short-range wireless communication device is prolonged.

In some embodiments, the determining, based on the actual received signal strength indications corresponding to the plurality of historical receive slots, a predicted received signal strength indication corresponding to a current receive slot includes: obtaining, when the actual received signal strength indications corresponding to the plurality of historical receive slots are all greater than a sensitivity limit value, the predicted received signal strength indication based on the actual received signal strength indications corresponding to the plurality of historical receive slots by using an interpolation algorithm.

In this solution, when the plurality of actual received signal strength indications are all greater than the sensitivity limit value of the radio frequency front-end module, it indicates that the short-range wireless communication chip receives signals uninterruptedly in the historical receive slots. That is, it indicates that the short-range wireless communication chip receives each signal in a corresponding historical receive slot, and it also indicates that a signal sending device sends each signal in a corresponding slot. In this case, a rule in which a plurality of actual values change continuously may be used, and the predicted value obtained by performing interpolation on the plurality of actual received signal strength indications by using the interpolation algorithm is closer to a real value, thereby improving accuracy of prediction of received signal strength and reducing a prediction error.

In some embodiments, the determining, based on the actual received signal strength indications corresponding to the plurality of historical receive slots, a predicted received signal strength indication corresponding to a current receive slot further includes: using, when an actual received signal strength indication that is not greater than the sensitivity limit value exists in the actual received signal strength indications corresponding to the plurality of historical receive slots, an actual received signal strength indication corresponding to a first reference slot in the plurality of historical receive slots as the predicted received signal strength indication. The first reference slot is a last historical receive slot obtained after the plurality of historical receive slots are arranged in time order.

In this solution, when there is a value less than or equal to the sensitivity limit value in the plurality of actual received signal strength indications, it indicates that the communication chip does not receive, in a slot less than the limit value, a signal sent by the sending device, or it is possible that the sending device does not send a signal. In this case, because a change rule in the plurality of actual values is discontinuous, an error between the predicted value and an actual value is enlarged when the interpolation algorithm is used for prediction. Therefore, in this operation, a last value obtained after the plurality of actual received signal strength indications are arranged in time order is used as a current predicted value, so that a change rule of the predicted value and the last value is uninterrupted.

In some embodiments, the determining, based on the actual received signal strength indications corresponding to the plurality of historical receive slots, a predicted received signal strength indication corresponding to a current receive slot further includes: using, when the current receive slot is a start receive slot of a transmission periodicity, and historical receive slots that satisfy a first condition exist in the plurality of historical receive slots, an actual received signal strength indication corresponding to a second reference slot in the historical receive slots that satisfy the first condition as the predicted received signal strength indication. The first condition includes that the actual received signal strength indication corresponding to the historical receive slot is greater than the sensitivity limit value, and the second reference slot is a last historical receive slot obtained after the historical receive slots that satisfy the first condition are arranged in time order.

In this solution, the actual signal strength indication of the second reference slot is a valid value closest to the current receive slot in terms of time, where "valid" means that the device receives a signal in the slot. By using this valid value as the predicted value of the current receive slot, the predicted value may satisfy a change rule of the signal as much as possible, and an error between the predicted value and a future actual value may be minimized to a largest extent.

In some embodiments, the receive channel includes a low noise amplifier; and the controlling, based on the predicted received signal strength indication, a gain coefficient of a receive channel in a radio frequency front-end module coupled to the short-range wireless communication chip in the current receive slot includes: short-circuiting the low noise amplifier when the predicted received signal strength indication satisfies a short-circuit condition, so that the gain coefficient is adjusted to zero. The short-circuit condition includes that the predicted received signal strength indication is greater than an enabling threshold of the low noise amplifier, or the predicted received signal strength indication is less than the sensitivity limit value, where the enabling threshold is greater than the sensitivity limit value.

In this solution, the predicted received signal strength indication satisfies the short-circuit condition, indicating that the low noise amplifier does not need to enable a signal in the current receive slot. Therefore, short-circuit control is performed on the low noise amplifier, and the short-circuit control can reduce power consumption of the radio frequency front-end module.

In some embodiments, the controlling, based on the predicted received signal strength indication, a gain coefficient of a receive channel in a radio frequency front-end module coupled to the short-range wireless communication chip in the current receive slot further includes: turning on the low noise amplifier when the predicted received signal strength indication satisfies an enabling condition of the radio frequency front-end module, so that the gain coefficient is adjusted to a gain value of the low noise amplifier. The enabling condition includes that the predicted received signal strength indication is not greater than the enabling threshold and is not less than the sensitivity limit value.

In this solution, the predicted received signal strength indication satisfies the enabling condition, indicating that the low noise amplifier needs to enable a signal in the current receive slot. Therefore, conduction control is performed on the low noise amplifier, and gain processing is performed on the signal in the current receive slot.

According to a second embodiment, this application provides a low-power-consumption control apparatus, and the apparatus includes: an obtaining module, configured to obtain actual received signal strength indications corresponding to a plurality of historical receive slots; a prediction module, configured to determine, based on the actual received signal strength indications corresponding to the plurality of historical receive slots, a predicted received signal strength indication corresponding to a current receive slot; and a control module, configured to adjust, based on the predicted received signal strength indication, a gain coefficient of a receive channel in a radio frequency front-end module coupled to the short-range wireless communication chip in the current receive slot.

In some embodiments, the prediction module is configured to: obtain, when the actual received signal strength indications corresponding to the plurality of historical receive slots are all greater than a sensitivity limit value, the predicted received signal strength indication based on the actual received signal strength indications corresponding to the plurality of historical receive slots by using an interpolation algorithm.

In some embodiments, the prediction module is further configured to: use, when an actual received signal strength indication that is not greater than the sensitivity limit value exists in the actual received signal strength indications corresponding to the plurality of historical receive slots, an actual received signal strength indication corresponding to a first reference slot in the plurality of historical receive slots as the predicted received signal strength indication. The first reference slot is a last historical receive slot obtained after the plurality of historical receive slots are arranged in time order.

In some embodiments, the prediction module is further configured to: use, when the current receive slot is a start receive slot of a transmission periodicity, and historical receive slots that satisfy a first condition exist in the plurality of historical receive slots, an actual received signal strength indication corresponding to a second reference slot in the historical receive slots that satisfy the first condition as the predicted received signal strength indication. The first condition includes that the actual received signal strength indication corresponding to the historical receive slot is greater than the sensitivity limit value, and the second reference slot is a last historical receive slot obtained after the historical receive slots that satisfy the first condition are arranged in time order.

In some embodiments, the receive channel includes a low noise amplifier; and the control module is configured to: short-circuit the low noise amplifier when the predicted received signal strength indication satisfies a short-circuit condition, so that the gain coefficient is adjusted to zero. The short-circuit condition includes that the predicted received signal strength indication is greater than an enabling threshold of the low noise amplifier, or the predicted received signal strength indication is less than the sensitivity limit value, where the enabling threshold is greater than the sensitivity limit value.

In some embodiments, the control module is further configured to: turn on the low noise amplifier when the predicted received signal strength indication satisfies an enabling condition of the low noise amplifier, so that the gain coefficient is adjusted to a gain value of the low noise amplifier. The enabling condition includes that the predicted received signal strength indication is not greater than the enabling threshold and is not less than the sensitivity limit value.

According to a third embodiment, this application provides a short-range wireless communication chip, used in a short-range wireless communication device, and the short-range wireless communication chip includes: at least one processor and a memory. The at least one processor is configured to invoke instructions stored in the memory, to perform the method according to the foregoing first embodiment.

In some embodiments, the determining, based on the actual received signal strength indications corresponding to the plurality of historical receive slots, a predicted received signal strength indication corresponding to a current receive slot includes: obtaining, when the actual received signal strength indications corresponding to the plurality of historical receive slots are all greater than a sensitivity limit value, the predicted received signal strength indication based on the actual received signal strength indications corresponding to the plurality of historical receive slots by using an interpolation algorithm.

In some embodiments, the determining, based on the actual received signal strength indications corresponding to the plurality of historical receive slots, a predicted received signal strength indication corresponding to a current receive slot further includes: using, when an actual received signal strength indication that is not greater than the sensitivity limit value exists in the actual received signal strength indications corresponding to the plurality of historical receive slots, an actual received signal strength indication corresponding to a first reference slot in the plurality of historical receive slots as the predicted received signal strength indication. The first reference slot is a last historical receive slot obtained after the plurality of historical receive slots are arranged in time order.

In some embodiments, the determining, based on the actual received signal strength indications corresponding to the plurality of historical receive slots, a predicted received signal strength indication corresponding to a current receive slot further includes: using, when the current receive slot is a start receive slot of a transmission periodicity, and historical receive slots that satisfy a first condition exist in the plurality of historical receive slots, an actual received signal strength indication corresponding to a second reference slot in the historical receive slots that satisfy the first condition as the predicted received signal strength indication. The first condition includes that the actual received signal strength indication corresponding to the historical receive slot is greater than the sensitivity limit value, and the second reference slot is a last historical receive slot obtained after the historical receive slots that satisfy the first condition are arranged in time order.

In some embodiments, the receive channel includes a low noise amplifier; and the controlling, based on the predicted received signal strength indication, a gain coefficient of a receive channel in a radio frequency front-end module coupled to the short-range wireless communication chip in the current receive slot includes: short-circuiting the low noise amplifier when the predicted received signal strength indication satisfies a short-circuit condition of the low noise amplifier, so that the gain coefficient is adjusted to zero. The short-circuit condition includes that the predicted received signal strength indication is greater than an enabling threshold of the low noise amplifier, or the predicted received signal strength indication is less than the sensitivity limit value, where the enabling threshold is greater than the sensitivity limit value.

In some embodiments, the controlling, based on the predicted received signal strength indication, a gain coefficient of a receive channel in a radio frequency front-end module coupled to the short-range wireless communication chip in the current receive slot further includes: turning on the low noise amplifier when the predicted received signal strength indication satisfies an enabling condition of the low noise amplifier, so that the gain coefficient is adjusted to a gain value of the low noise amplifier. The enabling condition includes that the predicted received signal strength indication is not greater than the enabling threshold and is not less than the sensitivity limit value.

According to a fourth embodiment, this application provides a radio frequency front-end module. The radio frequency front-end module includes a transmit channel and a receive channel, and a status of the receive channel in a current receive slot is determined based on a predicted received signal strength indication corresponding to the current receive slot. The predicted received signal strength indication is obtained based on actual received signal strength indications corresponding to a plurality of historical receive slots.

In some embodiments, a control circuit is configured to: obtain, when the actual received signal strength indications corresponding to the plurality of historical receive slots are all greater than a sensitivity limit value, the predicted received signal strength indication based on the actual received signal strength indications corresponding to the plurality of historical receive slots by using an interpolation algorithm.

In some embodiments, the control circuit is further configured to: use, when an actual received signal strength indication that is not greater than the sensitivity limit value exists in the actual received signal strength indications corresponding to the plurality of historical receive slots, an actual received signal strength indication corresponding to a first reference slot in the plurality of historical receive slots as the predicted received signal strength indication. The first reference slot is a last historical receive slot obtained after the plurality of historical receive slots are arranged in time order.

In some embodiments, the control circuit is further configured to: use, when the current receive slot is a start receive slot of a transmission periodicity, and historical receive slots that satisfy a first condition exist in the plurality of historical receive slots, an actual received signal strength indication corresponding to a second reference slot in the historical receive slots that satisfy the first condition as the predicted received signal strength indication. The first condition includes that the actual received signal strength indication corresponding to the historical receive slot is greater than the sensitivity limit value, and the second reference slot is a last historical receive slot obtained after the historical receive slots that satisfy the first condition are arranged in time order.

In some embodiments, the control circuit is further configured to: short-circuit a low noise amplifier when the predicted received signal strength indication satisfies a short-circuit condition of the low noise amplifier, so that a gain coefficient is adjusted to zero. The short-circuit condition includes that the predicted received signal strength indication is greater than an enabling threshold of the low noise amplifier, or the predicted received signal strength indication is less than the sensitivity limit value, where the enabling threshold is greater than the sensitivity limit value.

In some embodiments, the control circuit is further configured to: turn on the low noise amplifier when the predicted received signal strength indication satisfies an enabling condition of the low noise amplifier, so that the gain coefficient is adjusted to a gain value of the low noise amplifier. The enabling condition includes that the predicted received signal strength indication is not greater than the enabling threshold and is not less than the sensitivity limit value.

According to a fifth embodiment, this application provides a short-range wireless communication device, and the short-range wireless communication device includes: the short-range wireless communication chip according to the second embodiment and the radio frequency front-end module according to the fourth embodiment. The radio frequency front-end module is coupled to the short-range wireless communication chip.

According to a sixth embodiment, this application provides a computer-readable storage medium. The computer-readable storage medium stores computer program code, and when the computer program code is executed by a short-range wireless communication device, the short-range wireless communication device performs the method according to the foregoing first embodiment.

BRIEF DESCRIPTION OF DRAWINGS

FIG. 1 is a schematic diagram of a structure of a BT system in a short-range wireless communication device according to this application;

FIG. 2 is a flowchart of a low-power-consumption control method in an aperiodic service according to an embodiment of this application;

FIG. 3 is a time order diagram of an aperiodic continuous interaction of a wireless service according to an embodiment of this application;

FIG. 4 is a time order diagram of an aperiodic intermittent interaction of a wireless service according to an embodiment of this application;

DESCRIPTION OF EMBODIMENTS

Figure 5:
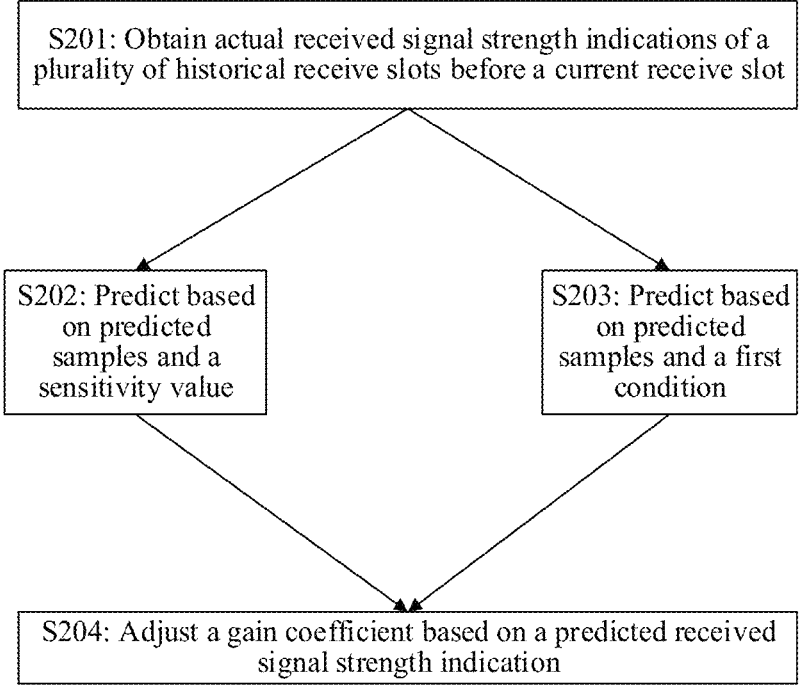
FIG. 5 is a flowchart of a low-power-consumption control method in a periodic service according to an embodiment of this application.

To make the objectives, technical solutions, and advantages of embodiments of this application clearer, the following describes the technical solutions in embodiments of this application with reference to the accompanying drawings.

In the description of embodiments of this application, the terms such as "example", "for example", or "for instance" are used to represent giving an example, an illustration, or a description. Any embodiment or design scheme described as an "example", "for example", or "for instance" in embodiments of this application should not be explained as being more preferred or having more advantageous than another embodiment or design scheme.

In the description of embodiments of this application, the term "and/or" is merely an association relationship for describing associated objects, and indicates that three relationships may exist. For example, A and/or B may indicate the following three cases: Only A exists, only B exists, and both A and B exist. In addition, unless otherwise specified, the term "a plurality of" means two or more. For example, a plurality of systems refer to two or more systems, and a plurality of screen terminals refer to two or more screen terminals.

In addition, the terms "first" and "second" are used merely for the purpose of description, and shall not be construed as indicating or implying relative importance or implying indicated technical features. Therefore, a feature defined by "first" or "second" may explicitly or implicitly include one or more of the feature. The terms "include", "comprise", "have", and variations thereof all mean "including, but not limited to", unless otherwise particularly specified.

Before a low-power-consumption control solution of a radio frequency front-end module provided in this application is described, the radio frequency front-end module, a receive slot, a send slot, and a received signal strength indication (RSSI) are first described, to facilitate understanding of the technical solutions and embodiments provided in this application.

The radio frequency front-end module is a basic component in a short-range wireless communication module, and is located between an antenna and a short-range wireless communication chip in the short-range wireless communication module. The radio frequency front-end module generally includes: a transmit channel and a receive channel. The two channels of the radio frequency front-end module play an important role in wireless communication, that is, converting a binary signal needed to be sent into a high-frequency radio signal during transmitting a signal, and converting a received radio signal into a binary digital signal during receiving a signal. The radio frequency front-end module implements signal conversion through modules such as a power amplifier (PA), a low noise amplifier (LNA), a filter, a duplexer, an antenna tuner (AT), and a switch that are included in the radio frequency front-end module.

The receive slot refers to a time period in which a receiving device receives a radio signal. The send slot is a time period in which a sending device sends a radio signal. For example, in a transmission link, after receiving a data packet Poll of a signal, the receiving device feeds back a Null packet to the sending device, to represent that a wireless device has received the radio signal sent by the sending device. Therefore, the receive slot and the send slot are used in this application to distinguish whether a device is in a signal receiving state or a signal sending state in a continuous time. For the receiving device in the foregoing transmission link, the receive slot and the send slot are continuous in terms of time, and two receive slots are arranged at intervals in terms of time.

The received signal strength indication RSSI indicates strength of a signal received by the receiving device, and may be obtained through calculation based on a power of the received signal. When the RSSI is calculated, a logarithm of a power value of the received signal in the receive slot is taken to obtain an actual received signal strength indication. For example, when a unit of measurement of the RSSI is dBm, if the power of the received signal is 1 mw, RSSI (1 mW)=10 lg (1 mW/1 mW)=0 dBm. Similarly, if the power of the received signal is 40 W, RSSI (40 W)=10 lg (40 W/1 mw)=10 lg (40000)=10 lg 4+10 lg 10+10 lg 1000=46 dBm. The RSSI may be used for determining connection quality of a link transmission link. In addition, the RSSI may be used for determining whether the radio frequency front-end module performs gain processing on the received signal.

The following uses a Bluetooth technology in a short-range wireless communication technology as an example to describe the solutions of this application in detail. It should be noted that, the technical solutions in this application are not limited to the Bluetooth technology, and may be further applied to another short-range wireless communication technology, a technology that replaces a Bluetooth standard, or the like.

In a scenario in which two short-range wireless communication devices perform wireless service transmission, the two short-range wireless communication devices are connected to each other by using respective BT systems, and transmit a short-range radio signal.

For example, the foregoing short-range wireless communication device may be any one of devices that have a short-range wireless communication function, such as a smartphone, a tablet computer, a portable computer, a desktop computer, a smart watch, a smart band, and a wireless headset. This is not limited in this application.

For example, the foregoing two short-range wireless communication devices may transmit a radio signal interactively, or may transmit a radio signal unidirectionally. Transmitting a radio signal interactively is that a receiving device in the two short-range wireless communication devices sends a feedback signal to a sending device when receiving a signal sent by the sending device.

FIG. 1 is a schematic diagram of a structure of a BT system according to an embodiment of this application. The BT system is used in the foregoing short-range wireless communication device.

Refer to FIG. 2. A BT system 100 includes a BT chip 110, a radio frequency front-end module 120, and an antenna 130.

For example, the radio frequency front-end module 120 is coupled to the antenna 130, and the radio frequency front-end module 120 may receive a signal from the antenna or send a signal through the antenna. The radio frequency front-end module 120 includes but is not limited to: a PA 121, an LNA 122, and a bypass circuit 123. It should be noted that, a type and a quantity of modules in the radio frequency front-end module 120 are merely examples. In another embodiment, the radio frequency front-end module 120 may include more modules. This is not limited in this application.

For example, the power amplifier 121 is disposed on a TX (transport, transmit) channel (referred to as TX for short below), and is configured to perform corresponding processing on a signal input by the BT chip through a sending circuit and output a processed signal to the antenna 130. For example, the LNA 122 is disposed on an RX (receive) channel (referred to as RX for short below), and is configured to perform corresponding processing on a signal received from the antenna 130, and output a processed signal to the BT chip 110. The bypass circuit 123 is coupled to two ends of the LNA 122, and is configured to control the LNA 122.

For example, the BT chip 110 may include:

the BT chip 110 is coupled to the radio frequency front-end module 120, and the BT chip 110 may send a signal by using the radio frequency front-end module 120; and the BT chip 110 may receive a signal by using the radio frequency front-end module 120. For example, the BT chip 110 may switch the TX and the RX in the radio frequency front-end module 120 by using a control signal, and adjust a working status of the LNA 122 in the RX.

For example, the LNA 122 has two working statuses (an enabled state and a short-circuited state). When the LNA 122 is in the enabled state, the LNA 122 performs gain processing on a signal received by the antenna. When the LNA 122 is in the short-circuited state, the LNA 122 does not perform gain processing on the signal received by the antenna, which is equivalent to a zero gain. For example, when gain processing does not need to be performed on the signal received by the antenna, the bypass circuit 123 is controlled to be turned on by using a first control signal to short-circuit the LNA 122, so that the working status of the LNA 122 is the short-circuited state, and further, a gain coefficient of the receive channel is zero. On the contrary, when gain processing needs to be performed on the signal received by the antenna, the bypass circuit 123 is controlled to be closed by using a second control signal to turn on the LNA 122, so that the working status of the LNA 122 is the enabled state. In this case, the gain coefficient of the receive channel is a gain value of the LNA 122.

Alternatively, in another embodiment, multi-level gain coefficients may be set for the receive channel of the radio frequency front-end module based on different requirements of different application scenarios, to perform multi-level gain processing on the signal received by the antenna. For example, when the receive channel can implement four levels, namely levels 0 to 3, of gain processing, level 0 indicates zero gain processing, and levels 1 to 3 indicate three different levels of non-zero gain processing. The four levels of gain processing correspond to different gain coefficients and enabling thresholds. When an RSSI of the signal received by the antenna satisfies an enabling threshold of a corresponding level, the gain coefficient of the receive channel is adjusted to a gain coefficient corresponding to the corresponding level. In some embodiments, a plurality of LNAs may be disposed in the receive channel, to implement a multi-level gain processing function of the receive channel, that is, when a gain level of the receive channel is determined, an LNA corresponding to the corresponding level is turned on, and the LNA is enabled to perform gain processing on a signal. In a zero gain level, all LNAs in the receive channel are short-circuited.

In an actual application scenario, two short-range wireless communication devices may periodically transmit a short-range wireless service, or may aperiodically transmit a short-range wireless service. Correspondingly, a short-range radio signal received by a receiving device may be a periodic short-range radio signal, or may be an aperiodic short-range radio signal. Generally, during signal transmission between two devices, an RX in a radio frequency front-end module needs to be controlled based on an RSSI of a signal sent by a sending device. In the conventional technologies, the LNA 122 in the RX is controlled to be in the enabled state in advance. Then, whether the receive channel of the radio frequency front-end module needs to perform gain processing on the corresponding signal is determined based on an RSSI value detected by the receiving device on the channel. In some embodiments, when a signal power is greater than a preset value, the radio frequency front-end module is turned off, and when the signal power is less than the preset value, the radio frequency front-end module remains turned on and enabled. In this method, the radio frequency front-end module has a long invalid turn-on time, namely, a time between a time when the radio frequency front-end module is turned on in advance and a time when a signal starts to be received. This undoubtedly increases power consumption of the receiving device, and a longer time indicates a greater power consumption loss of the receiving device.

Based on the foregoing analysis, in a short-circuited state, an embodiment of this application provides a low-power-consumption control method of a radio frequency front-end module. The method is applied to a short-range wireless communication chip, and the short-range wireless communication chip is used in a short-range wireless communication device. In this embodiment, the foregoing BT chip 110 is used as an example for the short-range wireless communication chip.

The following uses an example in which the short-range wireless communication device aperiodically receives a radio signal. With reference to FIG. 2, the low-power-consumption control method of the radio frequency front-end module according to this embodiment of this application is described in detail.

As shown in FIG. 2, the method may include the following operations S101 to S103.

Operation S101: Obtain actual received signal strength indications corresponding to a plurality of historical receive slots before a current receive slot as prediction samples.

In this embodiment, the current receive slot and the plurality of historical receive slots are continuous in terms of time, where the current receive slot refers to a slot in which the short-range wireless communication device has not received a signal. It may be understood that a quantity of the historical receive slots is not limited in this embodiment of this application. The historical actual received signal strength indications are used for predicting received signal strength corresponding to the current receive slot, and an obtained predicted value represents strength of a signal to be received by a BT apparatus in the current receive slot.

Operation S102: Predict the received signal strength corresponding to the current receive slot by using the prediction samples.

In this embodiment, when a predicted received signal strength indication corresponding to the current receive slot is obtained based on the actual received signal strength indications corresponding to the plurality of historical receive slots, comparison needs to be first performed based on the obtained actual received signal strength indications and a preset sensitivity limit value, to determine whether the short-range wireless communication device detects a short-range radio signal in a transmission channel in the plurality of historical receive slots, thereby determining whether the received signal strength of the current receive slot may be predicted by using a change rule of the plurality of actual received signal strength indications. The sensitivity limit value may be set based on sensitivity of detecting the signal by the short-range wireless communication device.

In a possible case, when the actual received signal strength indications corresponding to the plurality of historical receive slots are all greater than the sensitivity limit value, it indicates that the short-range wireless communication device detects a signal in each of the plurality of historical receive slots. In this case, a change rule may be obtained by using an interpolation algorithm based on the actual received signal strength indications corresponding to the plurality of historical receive slots, thereby obtaining the predicted received signal strength indication corresponding to the current receive slot. In some embodiments, the interpolation algorithm may be one of nearest-neighbor interpolation, bilinear quadratic interpolation, and cubic interpolation, or may be another interpolation algorithm that can implement a received signal strength prediction function. When the predicted received signal strength indication corresponding to the current receive slot is obtained by using the interpolation algorithm, a change trend of the actual received signal strength indications corresponding to the historical receive slots is first determined, and then an interpolation operation is performed by using the interpolation algorithm to obtain the predicted received signal strength indication corresponding to the current receive slot.

The following describes a prediction process of one of the foregoing cases in this embodiment with reference to a time order diagram of an aperiodic continuous interaction of a short-range wireless service shown in FIG. 3.

As shown in FIG. 3, when a slot slot6 is the current receive slot, received signal strength indications of three receive slots before the slot6 are used as the prediction samples. When an actual received signal strength indication RSSI0 corresponding to a first receive slot slot0, an actual received signal strength indication RSSI1 corresponding to a second receive slot slot2, and an actual received signal strength indication RSSI2 corresponding to a third receive slot slot4 are all greater than the sensitivity limit value, it indicates that the short-range wireless communication device detects a radio signal in each of the slot0, the slot2, and the slot4. In this case, the interpolation operation may be performed by using the interpolation algorithm on the RSSI0, the RSSI1, and the RSSI2 to obtain a predicted received signal strength indication RSSI3 corresponding to the fourth receive slot slot6. For example, when RSSI0>RSSI1>RSSI2, the RSSI3 corresponding to the slot6 may be predicted by using the interpolation algorithm, and the RSSI3 is less than the RSSI2; and when RSSI0<RSSI1<RSSI2, the RSSI3 corresponding to the slot6 may be predicted by using the interpolation algorithm, and the RSSI3 is greater than the RSSI2. In a possible application scenario, a distance change between the receiving device and the sending device may be determined by using an RSSI value of each slot. For example, when RSSI0>RSSI1>RSSI2, it indicates that a distance between the short-range wireless communication device and the signal sending device changes from a short distance to a long distance; and when RSSI0<RSSI1<RSSI2, it indicates that a distance between the short-range wireless communication device and the signal sending device changes from a long distance to a short distance.

In another possible case, when an actual received signal strength indication that is less than the sensitivity limit value exists in the actual received signal strength indications corresponding to the plurality of historical receive slots, it indicates that the short-range wireless communication device does not detect a signal in at least one slot in the plurality of historical receive slots. In this case, the change rule of the plurality of actual received signal strength indications is discontinuous and prediction cannot be performed by using the interpolation algorithm. Therefore, one receive slot is selected from the actual received signal strength indications greater than the sensitivity limit value as a reference slot, and an actual received signal strength indication corresponding to the reference slot is used as the predicted received signal strength indication corresponding to the current receive slot. The reference slot may be a last receive slot obtained after the plurality of historical receive slots are arranged in time order, that is to say, the reference slot is a slot closest to the current receive slot in terms of time.

The following describes a prediction process of another case of the foregoing cases in this embodiment with reference to a time order diagram of an aperiodic intermittent interaction of a short-range wireless service shown in FIG. 4.

As shown in FIG. 4, a slot6 is also used as the current receive slot, and received signal strength indications of three slots: a slot0, a slot2, and a slot4 are used as the prediction samples. When an actual received signal strength indication RSSI0 corresponding to the receive slot slot0 is greater than the sensitivity limit value, and neither an actual received signal strength indication RSSI1 corresponding to the receive slot slot2 nor an actual received signal strength indication RSSI2 corresponding to the receive slot slot4 is greater than the sensitivity limit value, it indicates that the short-range wireless device does not detect a signal in the slot2 and the slot4. In this case, there is no particular change rule among the RSSI0, the RSSI1, and the RSSI2, and prediction cannot be performed through interpolation. Therefore, the RSSI2 corresponding to the slot4 is directly used as a predicted received signal strength indication RSSI3 corresponding to the slot6.

Operation S103: Adjust a gain coefficient of a receive channel in the radio frequency front-end module in the current receive slot based on the predicted received signal strength indication corresponding to the current receive slot.

In this embodiment, the obtained predicted received signal strength indication is compared and analyzed with a preset working condition of the receive channel, and the gain coefficient of the receive channel and a control policy of the receive channel in the current receive slot are determined. That there are two cases for the receive channel: zero gain processing and non-zero gain processing is used as an example. The two cases are implemented by controlling whether an LNA in the RX is turned on or not.

Further, a short-circuit condition and an enabling condition may be set corresponding to the two cases each. In the short-circuit condition, the gain coefficient of the receive channel is zero, and no gain processing is performed on the signal. In the enabling condition, the gain coefficient of the receive channel is not zero, gain processing is performed on the signal. In this case, the gain coefficient is a gain value of the LNA in the receive channel.

In some embodiments, the short-circuit condition includes that the predicted received signal strength indication is greater than an enabling threshold, or the predicted received signal strength indication is less than the sensitivity limit value; and the enabling condition includes that the predicted received signal strength indication is between the enabling threshold and the sensitivity limit value. The enabling threshold is greater than the sensitivity limit value, and the enabling threshold is a threshold for determining whether the LNA in the radio frequency front-end module is enabled. When signal strength is greater than the enabling threshold, it indicates that a power of a signal to be received on the receive channel is large, and the LNA does not need to be enabled; when the signal strength is less than the enabling threshold and greater than the sensitivity limit value, it indicates that the power of the signal to be received on the receive channel is small, and the LNA needs to be enabled to perform gain processing on the signal; and when the signal strength is less than the sensitivity limit value, it indicates that the receive channel does not receive a signal, and it may also indicate that a peer end does not send a radio signal, or the receive channel cannot accurately receive a signal due to a long distance between devices, so that the radio frequency front-end module does not need to be enabled.

In some embodiments, when the predicted received signal strength indication satisfies the short-circuit condition, the LNA is controlled to be short-circuited, so that the gain coefficient in the receive channel is zero; and when the predicted received signal strength indication satisfies the enabling condition, the LNA is controlled to be turned on, so that the gain coefficient in the receive channel is the gain value designed by the LNA. For example, as shown in FIG. 1, the switch 123 may be controlled to be turned on or off by using different control signals, to respectively implement an objective of short-circuiting the LNA and an objective of turning on the LNA.

In some embodiments, if a plurality of types of gain processing may be implemented in the receive channel of the radio frequency front-end module 120, for example, a plurality of LNAs are designed in the receive channel, one LNA corresponds to one gain coefficient, and each LNA corresponds to one enabling threshold. In this scenario, when the predicted received signal strength indication satisfies the enabling condition, the gain coefficient of the receive channel may be determined by comparing the predicted received signal strength indication with each enabling threshold, and then an LNA corresponding to the gain coefficient is turned on.

In a possible scenario, for example, in a hardware performance test scenario of the short-range wireless communication device, to reflect BT performance of the short-range wireless communication device, when the predicted received signal strength indication is less than the sensitivity limit value, a working status of an LNA in the radio frequency front-end module may be forcibly controlled to be an enabled state, to detect the radio signal to a largest extent.

According to the method provided in this embodiment of this application, signal strength of the receive slot is predicted when the short-range wireless communication device aperiodically receives the signal, thereby adjusting the gain coefficient of the receive channel in the radio frequency front-end module. Compared with the conventional technologies in which a non-zero gain is preset for the receive channel, a time of the non-zero gain of the receive channel is shortened, and the power consumption of the radio frequency front-end module is reduced.

In a possible application scenario, when the short-range wireless communication device periodically receives a signal, after signal interaction in one periodicity ends, there may be one or more receive slots in which the device has no signal to receive. In this case, if a current receive slot is a first receive slot of a transmission periodicity, if a predicted received signal strength indication corresponding to the current receive slot is predicted by using the low-power-consumption control method shown in FIG. 2, a large error exists between a predicted value and a future actual value.

Therefore, an embodiment of this application further provides a low-power-consumption control method applied to a scenario in which a signal is periodically transmitted. With reference to FIG. 5, the following uses an example in which a short-range wireless communication device periodically receives a radio signal to describe in detail the low-power-consumption control method in this embodiment of this application.

As shown in FIG. 5, the method may include the following operations S201 to S204.

Operation S201: Obtain actual received signal strength indications corresponding to a plurality of historical receive slots before a current receive slot as prediction samples, and if the current receive slot is a start receive slot of a transmission periodicity, perform operation S203; otherwise, perform operation S202.

In this embodiment, a BT chip 110 may determine a length of the transmission periodicity by using a transmission protocol, and then determine, by using a method of setting a timer, whether the current receive slot is the start receive slot of the transmission periodicity.

Operation S202: Predict received signal strength of the current receive slot based on a sensitivity limit value and the prediction samples.

In this embodiment, when the current receive slot is not the start receive slot of the transmission periodicity, the actual received signal strength indications corresponding to the plurality of historical receive slots and the sensitivity limit value are compared, to determine whether the short-range wireless device detects a signal on a transmission channel. In different application scenarios, the sensitivity limit value may be set based on sensitivity of detecting a signal by a receiving device. This is not limited in this application.

For example, when the actual received signal strength indications corresponding to the plurality of historical receive slots are all greater than the sensitivity limit value, it indicates that the short-range wireless device detects a signal in each of the plurality of historical receive slots. In this case, a predicted received signal strength indication corresponding to the current receive slot may be obtained by using an interpolation algorithm based on the actual received signal strength indications corresponding to the plurality of historical receive slots. When an actual received signal strength indication that is less than the sensitivity limit value exists in the actual received signal strength indications corresponding to the plurality of historical receive slots, it indicates that the short-range wireless device does not detect a signal in at least one slot in the plurality of historical receive slots. In this case, an actual received signal strength indication corresponding to a historical receive slot closest to the current receive slot in terms of time is selected from actual received signal strength indications greater than the sensitivity limit value as the predicted received signal strength indication corresponding to the current receive slot.

In some embodiments, during obtaining the predicted received signal strength indication corresponding to the current receive slot by using the interpolation algorithm, a change trend of the actual received signal strength indications corresponding to the historical receive slots needs to be first determined, and then an interpolation operation is performed by using the interpolation algorithm to obtain the predicted received signal strength indication. By using actual received signal strength indications corresponding to three historical receive slots as an example, with reference to a time order diagram of a periodic interaction of a wireless service shown in FIG. 6a, the following, for example, describes a process of obtaining the predicted value by using the interpolation algorithm in a scenario in which the short-range wireless device periodically receives the radio signal in this embodiment.

Figure 6A:
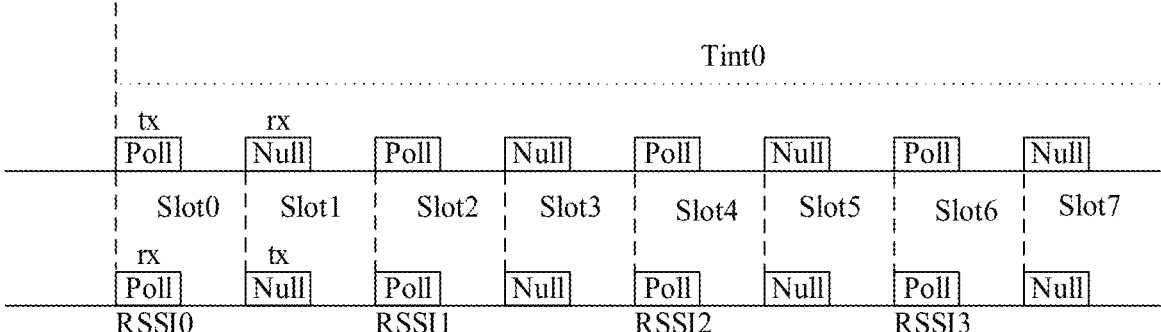
FIG. 6*a* is a time order diagram of a periodic interaction of a wireless service according to an embodiment of this application.

As shown in FIG. 6a, the short-range wireless device periodically receives the signal. By using an example in which the current receive slot is a receive slot slot6 in a transmission periodicity tint0, if the slot6 is not a start receive slot in the tint0, obtained prediction samples include an actual received signal strength indication RSSI0 corresponding to a receive slot slot0, an actual received signal strength indication RSSI1 corresponding to a receive slot slot2, and an actual received signal strength indication RSSI2 corresponding to a receive slot slot4. In this case, the interpolation operation may be performed on the RSSI0, the RSSI1, and the RSSI2, to obtain a predicted received signal strength indication RSSI4 corresponding to the receive slot slot6.

In operation S203, received signal strength of the current receive slot is predicted based on the prediction samples and a first condition, where the first condition is a prediction condition of received signal strength of the start receive slot.

In this embodiment, because the current receive slot is the start receive slot of the transmission periodicity, whether the prediction samples satisfy the first condition needs to be determined.

Figure 6B:
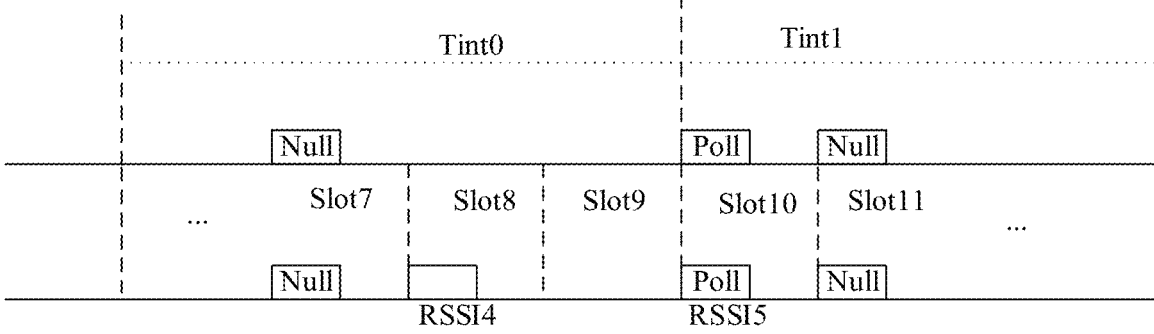
FIG. 6*b* is a time order diagram of a periodic interaction of a wireless service according to an embodiment of this application.

When a receive slot that satisfies the first condition exists in the prediction samples, an actual received signal strength indication corresponding to a second reference slot in historical receive slots that satisfy the first condition as the predicted received signal strength indication, where the first condition may include that the actual received signal strength indication corresponding to the historical receive slot is greater than the sensitivity limit value, and the second reference slot is a last historical receive slot obtained after the historical receive slots that satisfy the first condition are arranged in time order. It may be understood that the actual strength indication of the second reference slot is a valid value closest to the current receive slot in terms of time. For example, as shown in FIG. 6b, if the current receive slot is a receive slot slot10 in a transmission periodicity tint1, the slot10 is a start receive slot of the tint1. When the obtained actual received signal strength indications of the historical receive slots are: the RSSI1 corresponding to the slot2, the RSSI2 corresponding to the slot4, and the RSSI3 corresponding to the slot6, when the RSSI3 corresponding to the slot6 satisfies the first condition and the slot6 is closest to the current receive slot in terms of time, the slot6 may be used as the second reference slot. Therefore, the RSSI3 is selected as a predicted received signal strength indication corresponding to the receive slot slot10.

When no receive slot that satisfies the first condition exists in the prediction samples, an actual received signal strength indication corresponding to a last receive slot obtained after the plurality of historical receive slots are arranged in time order as the predicted received signal strength indication of the current receive slot.

Operation S204: Adjust a gain coefficient of a receive channel in a radio frequency front-end module in the current receive slot based on the predicted received signal strength indication. In this embodiment, description of this operation is the same as the description in operation S103, and details are not described herein again.

According to the method provided in this embodiment of this application, when the short-range wireless device periodically receives the radio signal, in the start receive slot of the transmission periodicity, an actual strength indication closest to the start receive slot in terms of time is used as a predicted value of the start receive slot. A prediction error between the prediction value and a future actual value is reduced by making the prediction value satisfy a change rule of the signal in the transmission periodicity as much as possible.

Figure 7:
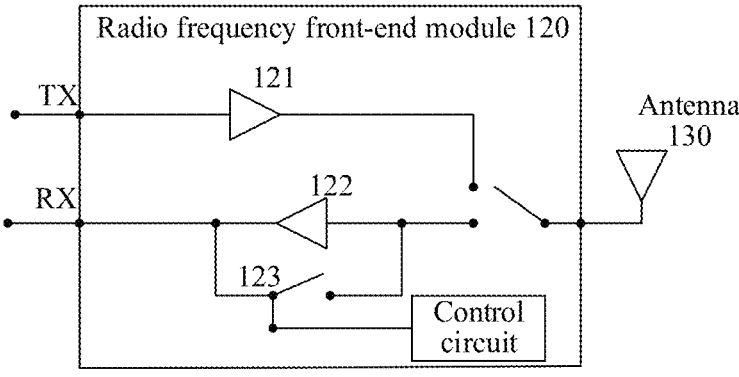
FIG. 7 is a schematic diagram of a structure of a radio frequency front-end module according to an embodiment of this application.

Based on the foregoing low-power-consumption control method embodiments shown in FIG. 2 and FIG. 5, this application further provides a radio frequency front-end module 120. As shown in FIG. 7, the radio frequency front-end module 120 includes an LNA 122 and a control circuit. A TX channel and an RX channel on a left side of the radio frequency front-end module 120 may be coupled to a short-range wireless chip (for example, a Bluetooth chip 110), and the module may be coupled to an antenna 130 on a right side to transmit a signal or receive a signal.

The control circuit is configured to control a gain coefficient of the LNA in a current receive slot based on a predicted received signal strength indication. For example, refer to operation S103 in the method embodiment shown in FIG. 2 and operation S204 in the method embodiment shown in FIG. 5. Details are not described herein again.

The predicted received signal strength indication is determined based on actual received signal strength indications that correspond to a plurality of historical receive slots and are output by the LNA. Refer to operations S101 and S102 in the method embodiment shown in FIG. 2 and operations S201 to S203 in the method embodiment shown in FIG. 5. Details are not described herein again.

Based on the foregoing low-power-consumption control method embodiments shown in FIG. 2 and FIG. 5, an embodiment of this application further provides a low-power-consumption control apparatus, which may be used in a short-range wireless communication device. The low-power-consumption control apparatus is configured to control a gain coefficient of a receive channel in a radio frequency front-end module, to shorten an invalid gain time of the receive channel and reduce power consumption of the radio frequency front-end module. A function of the low-power-consumption control apparatus may be implemented by a software system, or may be implemented by a hardware device, or may be implemented by a combination of a software system and a hardware device.

Figure 8:
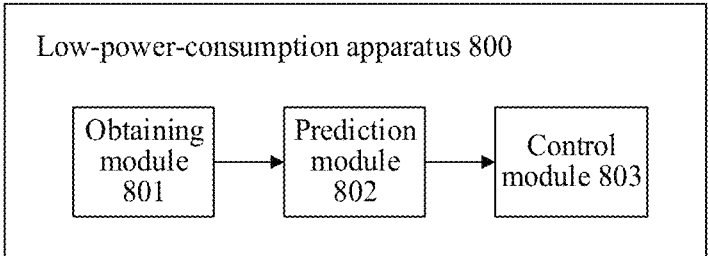
FIG. 8 is a schematic diagram of a structure of a low-power-consumption control apparatus according to an embodiment of this application.

When the low-power-consumption control apparatus is a software apparatus, refer to a low-power-consumption control apparatus 800 shown in FIG. 8. The low-power-consumption control apparatus 800 may be logically divided into a plurality of modules, each module may have a different function, and a function of each module is implemented by a processor in a computing device reading and executing instructions in a memory. As shown in FIG. 7, the low-power-consumption control apparatus 800 may include an obtaining module 801, a prediction module 802, and a control module 803. It should be noted that, in this embodiment of this application, only a structure and a function module of the low-power-consumption control apparatus 800 are divided as an example, but a particular division thereof is not limited.

In this embodiment, the obtaining module 801 is configured to obtain actual received signal strength indications corresponding to a plurality of historical receive slots as prediction samples. The actual received signal strength indication is determined based on a signal detected by the short-range wireless communication device on a channel. For example, the actual received signal strength indication may be determined by using the foregoing calculation method in this application.

The prediction module 802 is configured to predict a strength indication of a signal to be received in a next receive slot based on the actual received signal strength indications corresponding to the plurality of historical receive slots, to obtain a predicted received signal strength indication corresponding to the next receive slot. Because strength of a radio signal sent by a peer device changes slowly in a frame-level time (e.g., millisecond level), no sudden step change occurs. Therefore, strength of a radio signal to be received in the next receive slot may be predicted based on the historical actual received signal strength indications, and the obtained predicted value may be used as an effective reference for an actual value.

The control module 803 is configured to adjust a gain coefficient of a receive channel based on the predicted received signal strength indication.

For execution processes of the foregoing three functional modules, refer to the content of the present disclosure and the description in the foregoing method embodiments. Details are not described herein again.

Figure 9:
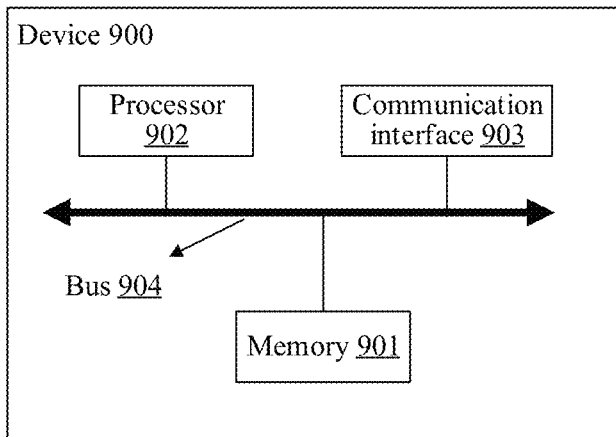
FIG. 9 is a schematic diagram of a structure of a computing device according to an embodiment of this application.

When the low-power-consumption control apparatus is a hardware device, the low-power-consumption control apparatus may be the foregoing short-range wireless communication device. FIG. 9 is a schematic diagram of a structure of a short-range wireless communication device 900 according to an embodiment of this application. The short-range wireless communication device 900 includes at least one processor 901, a communication bus 902, a memory 903, and at least one communication interface 904.

The processor 901 may be a general-purpose central processing unit (CPU), an application-specific integrated circuit (ASIC), a graphics processing unit (GPU), or any combination thereof. The processor 901 may include one or more chips, and the processor 901 may include an AI accelerator, for example, a neural processing unit (NPU).

The communication bus 902 may include a channel which transmits information among components (for example, the processor 901, the memory 903, and the communication interface 904) of the short-range wireless communication device 900.

The memory 903 may be a read-only memory (ROM) or another type of static storage device capable of storing static information and instructions, or a random access memory (RAM) or another type of dynamic storage device capable of storing information and instructions, or may be an electrically erasable programmable read-only memory EEPROM), a compact disc read-only memory (CD-ROM) or another compact disc storage, optical disc storage (including a compressed optical disc, a laser disc, an optical disc, a digital versatile optical disc, a Blu-ray disc, or the like), a magnetic disk storage medium or another magnetic storage device, or any other medium capable of carrying or storing expected program code in a form of an instruction or a data structure and capable of being accessed by a computer. This is not limited thereto. The memory 903 may exist independently, and is connected to the processor 901 through the communication bus 902. Alternatively, the memory 903 and the processor 901 may be integrated together. The memory 903 may store computer instructions. When the computer instructions stored in the memory 903 are executed by the processor 901, a model optimization method in this application may be implemented. In addition, the memory 903 may further store data required by the processor during performing the foregoing method, and intermediate data and/or result data generated by the processor.

By using any apparatus such as a transceiver, the communication interface 904 is configured to communicate with another device or communication network such as the Ethernet, a radio access network (RAN), or a wireless local area network (WLAN).

In some embodiments, the processor 901 may include one or more CPUs.

In some embodiments, the short-range wireless communication device 900 may include a plurality of processors. Each of these processors may be a single-core processor (single-CPU), or may be a multi-core processor (multi-CPU). The processor herein may be one or more devices, circuits, and/or processing cores configured to process data (for example, computer program instructions).

Based on the foregoing low-power-consumption control method embodiment, an embodiment of this application further provides a computer-readable storage medium. The computer-readable storage medium stores computer program code, and when the computer program code is executed by a computing device, the computing device performs the method operations in the foregoing low-power-consumption control method embodiment.

It may be understood that the processor in this embodiment of this application may be a central processing unit (CPU), or may be another general-purpose processor, a digital signal processor (DSP), an application specific integrated circuit (ASIC), a field programmable gate array (FPGA), or another programmable logic module, a transistor logic module, a hardware component, or any combination thereof. The general-purpose processor may be a microprocessor, or may be any conventional processor.

The method operations in the embodiments of this application may be implemented in a hardware manner, or may be implemented by executing software instructions by a processor. The software instructions may include a corresponding software module. The software module may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or any other programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

It may be understood that numerical symbols involved in the embodiments of this application are differentiated merely for ease of description, but are not used to limit the scope of the embodiments of this application.

What is claimed is:

1. A low-power-consumption control method, comprising:

obtaining actual received signal strength indications corresponding to a plurality of historical receive slots;

determining, based on the actual received signal strength indications, a predicted received signal strength indication corresponding to a current receive slot; and controlling, based on the predicted received signal strength indication, a gain coefficient of a receive channel in a radio frequency front-end module coupled to a short-range wireless communication chip in the current receive slot.

2. The method according to claim 1, wherein determining the predicted received signal strength indication further comprises:

when the actual received signal strength indications are all greater than a sensitivity limit value, obtaining the predicted received signal strength indication based on the actual received signal strength indications using an interpolation algorithm.

3. The method according to claim 2, wherein determining the predicted received signal strength indication further comprises:

when the actual received signal strength indications comprise at least one actual received signal indication that is not greater than the sensitivity limit value, using an actual received signal strength indication corresponding to a first reference slot in the plurality of historical receive slots as the predicted received signal strength indication, wherein the first reference slot is a last historical receive slot obtained after the plurality of historical receive slots are arranged in time order.

4. The method according to claim 1, wherein determining the predicted received signal strength indication further comprises:

when the current receive slot is a start receive slot of a transmission periodicity, and historical receive slots that satisfy a first condition exist in the plurality of historical receive slots, using an actual received signal strength indication corresponding to a second reference slot in the historical receive slots that satisfy the first condition as the predicted received signal strength indication, wherein the first condition comprises that the actual received signal strength indication corresponding to the historical receive slot is greater than a sensitivity limit value, and the second reference slot is a last historical receive slot obtained after the historical receive slots that satisfy the first condition are arranged in time order.

5. The method according to claim 1, wherein the receive channel comprises a low noise amplifier; and controlling the gain coefficient of the receive channel in the radio frequency front-end module further comprises:

short-circuiting the low noise amplifier when the predicted received signal strength indication satisfies a short-circuit condition of the low noise amplifier, so that the gain coefficient is adjusted to zero, wherein the short-circuit condition comprises that the predicted received signal strength indication is greater than an enabling threshold of the low noise amplifier, or the predicted received signal strength indication is less than a sensitivity limit value, wherein the enabling threshold is greater than the sensitivity limit value.

6. The method according to claim 5, wherein controlling the gain coefficient of the receive channel in the radio frequency front-end module further comprises:

turning on the low noise amplifier, in response to determining that the predicted received signal strength indication is not greater than the enabling threshold and is not less than the sensitivity limit value, so that the gain coefficient is adjusted to a gain value of the low noise amplifier.

7. A short-range wireless communication chip, comprising:

at least one processor; and a memory to store instructions that, when executed by the at least one processor, causes the at least one processor to perform following operations:

obtaining actual received signal strength indications corresponding to a plurality of historical receive slots;

determining, based on the actual received signal strength indications, a predicted received signal strength indication corresponding to a current receive slot; and controlling, based on the predicted received signal strength indication, a gain coefficient of a receive channel in a radio frequency front-end module coupled to the short-range wireless communication chip in the current receive slot.

8. The short-range wireless communication chip according to claim 7, wherein determining the predicted received signal strength indication comprises:

obtaining, when the actual received signal strength indications are all greater than a sensitivity limit value, the predicted received signal strength indication based on the actual received signal strength indications using an interpolation algorithm.

9. The short-range wireless communication chip according to claim 8, wherein determining the predicted received signal strength indication further comprises:

when the actual received signal strength indications comprise at least one actual received signal strength indication that is not greater than the sensitivity limit value, using an actual received signal strength indication corresponding to a first reference slot in the plurality of historical receive slots as the predicted received signal strength indication, wherein the first reference slot is a last historical receive slot obtained after the plurality of historical receive slots are arranged in time order.

10. The short-range wireless communication chip according to claim 7, wherein determining the predicted received signal strength indication further comprises:

when the current receive slot is a start receive slot of a transmission periodicity, and historical receive slots that satisfy a first condition exist in the plurality of historical receive slots, using an actual received signal strength indication corresponding to a second reference slot in the historical receive slots that satisfy the first condition as the predicted received signal strength indication, wherein the first condition comprises that the actual received signal strength indication corresponding to the historical receive slot is greater than a sensitivity limit value, and the second reference slot is a last historical receive slot obtained after the historical receive slots that satisfy the first condition are arranged in time order.

11. The short-range wireless communication chip according to claim 7, wherein the receive channel comprises a low noise amplifier; and controlling the gain coefficient of the receive channel in the radio frequency front-end module comprises:

short-circuiting the low noise amplifier when the predicted received signal strength indication satisfies a short-circuit condition of the low noise amplifier, so that the gain coefficient is adjusted to zero, wherein the short-circuit condition comprises that the predicted received signal strength indication is greater than an enabling threshold of the low noise amplifier, or the predicted received signal strength indication is less than a sensitivity limit value, wherein the enabling threshold is greater than the sensitivity limit value.

12. The short-range wireless communication chip according to claim 11, wherein controlling the gain coefficient of the receive channel in the radio frequency front-end module further comprises:

turning on the low noise amplifier, in response to determining that the predicted received signal strength indication is not greater than the enabling threshold and is not less than the sensitivity limit value, so that the gain coefficient is adjusted to a gain value of the low noise amplifier.

13. A radio frequency front-end module, comprising:

a low noise amplifier (LNA); and a control circuit configured to control a gain coefficient of the LNA in a current receive slot based on a predicted received signal strength indication, and the predicted received signal strength indication is determined based on actual received signal strength indications corresponding to a plurality of historical receive slots that are output by the LNA.

14. The radio frequency front-end module according to claim 13, wherein the control circuit is configured to:

when the actual received signal strength indications are all greater than a sensitivity limit value, obtain the predicted received signal strength indication based on the actual received signal strength indications using an interpolation algorithm.

15. The radio frequency front-end module according to claim 14, wherein the control circuit is further configured to:

when the actual received signal strength indications comprise at least one actual received signal indication that is not greater than the sensitivity limit value, use an actual received signal strength indication corresponding to a first reference slot in the plurality of historical receive slots as the predicted received signal strength indication, wherein the first reference slot is a last historical receive slot obtained after the plurality of historical receive slots are arranged in time order.

16. The radio frequency front-end module according to claim 13, wherein the control circuit is further configured to:

when the current receive slot is a start receive slot of a transmission periodicity, and historical receive slots that satisfy a first condition exist in the plurality of historical receive slots, use an actual received signal strength indication corresponding to a second reference slot in the historical receive slots that satisfy the first condition as the predicted received signal strength indication, wherein the first condition comprises that the actual received signal strength indication corresponding to the historical receive slot is greater than a sensitivity limit value, and the second reference slot is a last historical receive slot obtained after the historical receive slots that satisfy the first condition are arranged in time order.

17. The radio frequency front-end module according to claim 13, wherein the control circuit is further configured to:

short-circuit the low noise amplifier when the predicted received signal strength indication satisfies a short-circuit condition of the low noise amplifier, so that the gain coefficient is adjusted to zero, wherein the short-circuit condition comprises that the predicted received signal strength indication is greater than an enabling threshold of the low noise amplifier, or the predicted received signal strength indication is less than a sensitivity limit value, wherein the enabling threshold is greater than the sensitivity limit value.

18. The radio frequency front-end module according to claim 17, wherein the control circuit is further configured to:

turn on the low noise amplifier, in response to determining that the predicted received signal strength indication is not greater than the enabling threshold and is not less than the sensitivity limit value, so that the gain coefficient is adjusted to a gain value of the low noise amplifier.

* * * * *